(12) United States Patent
Andrews (10) Patent No.: US 12,162,596 B2
(45) Date of Patent: Dec. 10, 2024

(54) ROTOR ACTIVE STABILITY CONTROL

(71) Applicant: Kymatics, LLC, Pleasanton, CA (US)

(72) Inventor: Joseph John Andrews, Oakland, CA (US)

(*) Notice: Subject to any disclaimer, the term of this patent is extended or adjusted under 35 U.S.C. 154(b) by 0 days.

(21) Appl. No.: 17/781,710

(22) PCT Filed: Jan. 29, 2021

(86) PCT No.: PCT/US2021/015613
§ 371 (c)(1),
(2) Date: Jun. 2, 2022

(87) PCT Pub. No.: WO2021/201961
PCT Pub. Date: Oct. 7, 2021

(65) Prior Publication Data
US 2023/0192282 A1 Jun. 22, 2023

Related U.S. Application Data

(60) Provisional application No. 62/969,151, filed on Feb. 3, 2020.

(51) Int. Cl.
*B64C 27/57* (2006.01)
*B64C 29/02* (2006.01)

(52) U.S. Cl.
CPC ............ *B64C 27/57* (2013.01); *B64C 29/02* (2013.01)

(58) Field of Classification Search
CPC .................................. B64C 27/57; B64C 29/02
See application file for complete search history.

(56) References Cited

U.S. PATENT DOCUMENTS

| 11,572,868 | B1* | 2/2023 | Seeley | F03D 80/50 |
| 2004/0057828 | A1* | 3/2004 | Bosche | F03D 7/046 |
| | | | | 416/31 |
| 2004/0175260 | A1* | 9/2004 | Berthillier | F01D 5/10 |
| | | | | 415/1 |
| 2007/0001052 | A1* | 1/2007 | Strehlow | F16F 15/02 |
| | | | | 244/99.1 |
| 2009/0321555 | A1* | 12/2009 | Nitzsche | B64C 27/615 |
| | | | | 244/17.13 |
| 2010/0047067 | A1 | 2/2010 | Houser et al. | |
| 2010/0278636 | A1* | 11/2010 | Richter | F01D 5/26 |
| | | | | 415/119 |
| 2011/0062278 | A1* | 3/2011 | Ulrich | B64C 39/024 |
| | | | | 244/48 |
| 2011/0150648 | A1* | 6/2011 | Andersen | F03D 17/00 |
| | | | | 416/61 |
| 2011/0158806 | A1* | 6/2011 | Arms | F03D 7/0224 |
| | | | | 455/507 |

(Continued)

*Primary Examiner* — Donald J Wallace
*Assistant Examiner* — Jalal C Coduroglu
(74) *Attorney, Agent, or Firm* — Michael A. Blake (57) ABSTRACT

A method for stabilizing a motion of a rotor blade of a rotor comprising the steps: read into a controller, a measurement from a sensor responsive to said rotor blade; determine an out-of-compliance motion of the rotor blade; and output a first control signal to an actuator affecting the rotor blade such that a vibration mode of said rotor blade is dampened. The damping may be achieved by changing the drag, lift or torsion of the rotor blade. The out-of-compliance motion may be a lead, lag, upward motion, downward motion or twist of the rotor blade away from a nominal value.

20 Claims, 6 Drawing Sheets

(56) References Cited

U.S. PATENT DOCUMENTS

| | | | |
|---|---|---|---|
| 2012/0263592 A1* | 10/2012 | Lind | F03D 17/00 |
| | | | 416/61 |
| 2013/0105637 A1* | 5/2013 | Stamps | B64C 27/605 |
| | | | 244/76 R |
| 2013/0173224 A1 | 7/2013 | Santerre et al. | |
| 2014/0003939 A1* | 1/2014 | Adams | F03D 7/0224 |
| | | | 416/1 |
| 2014/0064962 A1 | 3/2014 | Brewer et al. | |
| 2014/0277855 A1* | 9/2014 | Sahasrabudhe | B64C 27/57 |
| | | | 701/3 |
| 2014/0301842 A1* | 10/2014 | Koerber | F03D 7/0224 |
| | | | 416/1 |
| 2016/0252075 A1* | 9/2016 | Krüger | F03D 17/00 |
| | | | 416/1 |
| 2018/0173220 A1* | 6/2018 | Wang | G06F 3/04883 |
| 2018/0187647 A1* | 7/2018 | Perley | F03D 7/0224 |
| 2018/0339770 A1* | 11/2018 | Brunken | B64C 27/57 |
| 2018/0348764 A1* | 12/2018 | Zhang | G05D 1/0669 |
| 2019/0023388 A1 | 1/2019 | Roberts et al. | |
| 2019/0118942 A1* | 4/2019 | Kim | B64C 11/06 |
| 2019/0178231 A1* | 6/2019 | Tomas | F03D 7/02 |
| 2019/0263515 A1* | 8/2019 | Karem | B64C 39/024 |
| 2019/0291861 A1* | 9/2019 | McIntyre | B64C 11/26 |
| 2019/0382104 A1* | 12/2019 | Low | B64C 29/02 |

* cited by examiner

ROTOR ACTIVE STABILITY CONTROL

CROSS-REFERENCE TO RELATED APPLICATIONS

This application is a US National Phase entry for International Application No. PCT/US2021/015613, titled "ROTOR ACTIVE STABILITY CONTROL" filed on Jan. 29, 2021, which claims the benefit of, and priority to, U.S. Provisional Application No. 62/969,151, titled "ROTORCRAFT ACTIVE STABILITY CONTROL" filed on Feb. 3, 2020, the entire specifications of which are incorporated herein by reference.

TECHNICAL FIELD

The inventions described herein are in the field of rotor active stability control.

BACKGROUND ART

There is a long felt need for a method of stabilizing a rotor. A rotor, for example, might be a rotor on a rotorcraft or a rotor on another object, such as a wind turbine.

DISCLOSURE OF INVENTION

The disclosure of invention is provided as a guide to understanding the invention. It does not necessarily describe the most generic embodiment of the invention or the broadest range of alternative embodiments.

A method for stabilizing a motion of a rotor blade of a rotor may comprise the steps:
  a) read into a controller, a measurement from a sensor responsive to said rotor blade, said measurement being of a motion of said rotor blade;
  b) determine, by said controller, an out-of-compliance motion of said rotor blade, said out-of-compliance motion of said rotor blade being a difference between said measured motion of said rotor blade and a nominal motion of said rotor blade; and
  c) output, from said controller, a first control signal to an actuator affecting said rotor blade
  wherein:
  d) said first control signal is determined by a control algorithm executed by said controller;
  e) said actuator causes a change in one or more of a drag, lift or torsion of said rotor blade counter to said out-of-compliance motion of said rotor blade; and
  f) said out-of-compliance motion of said rotor blade is one or more of:
  i) a lead of said rotor blade ahead of said nominal motion of said rotor blade;
  ii) a lag of said rotor blade behind said nominal motion of said rotor blade;
  iii) an upward motion of said rotor blade above said nominal motion of said rotor blade;
  iv) a downward motion of said rotor blade below said nominal motion of said rotor blade; or
  v) a twist of said rotor blade away from said nominal motion of said rotor blade.

BEST MODE FOR CARRYING OUT THE INVENTION

The detailed description describes non-limiting exemplary embodiments. Any individual features may be combined with other features as required by different applications for at least the benefits described herein. As used herein, the term "about" means plus or minus 10% of a given value unless specifically indicated otherwise.

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

As used herein, a "computer-based system" comprises an input device for receiving data, an output device for outputting data in tangible form (e.g., printing or displaying on a computer screen), a permanent digital memory for storing data, computer code or other digital instructions, and a digital processor for executing digital instructions wherein said digital instructions resident in said permanent memory will physically cause said digital processor to read-in data via said input device, process said data within said microprocessor and output said processed data via said output device. The digital processor may be a microprocessor.

As used herein, a controller may comprise one or more of a computer-based system, an analog controller, a mechanical controller or a fluid based controller.

As used herein, equations represent short-hand notations of steps to be carried out on a computing device such as a controller.

As used herein, the term "shaped" means that an item has the overall appearance of a given shape even if there are minor variations from the pure form of said given shape.

As used herein, the term "generally" when referring to a shape means that an ordinary observer will perceive that an object has said shape even if there are minor variations from said shape.

As used herein, relative orientation terms, such as "up", "down", "top", "bottom", "left", "right", "vertical", "horizontal", "distal" and "proximal" are defined with respect to an initial presentation of an object and will continue to refer to the same portion of an object even if the object is subsequently presented with an alternative orientation, unless otherwise noted.

As used herein, the terms "alternatively", "also", and the like refer to both exclusive embodiments (e.g., either A or B) and inclusive embodiments (e.g., both A and B).

Exemplary Rotorcraft

Figures 1A, 1B:
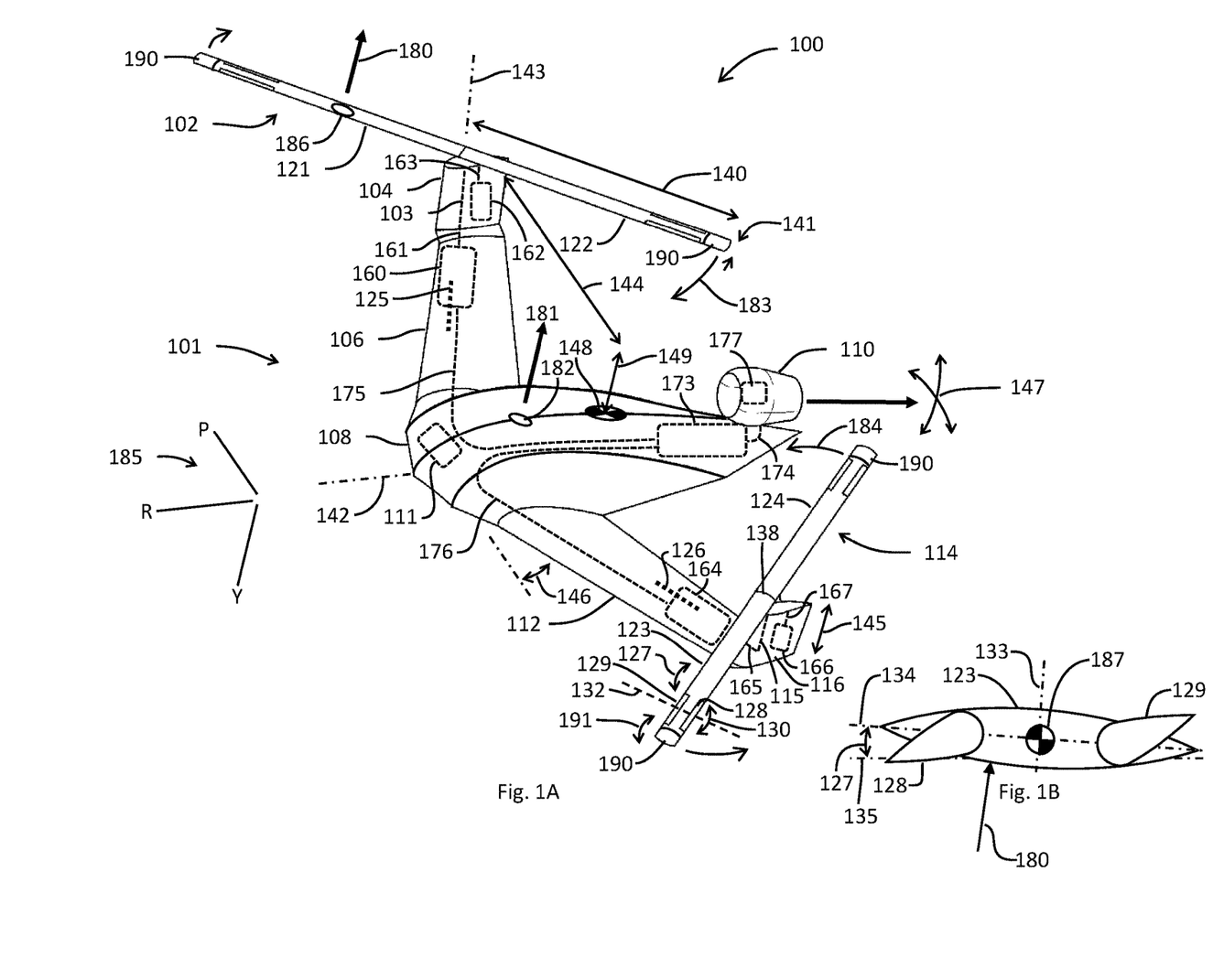
FIG. 1A is a perspective view of an exemplary rotorcraft.
FIG. 1B is a cross section of a blade of a rotor of the rotorcraft of FIG. 1A.

FIG. 1A is a perspective view of an exemplary rotorcraft 100 to which the methods described herein for stabilizing a motion of a rotor blade of a rotor may be applied. The methods described herein will be illustrated with respect to said rotorcraft. The methods described herein, however, may be applied to any rotor of any device, such as an alternative rotorcraft design or a wind turbine.

FIG. 1B is a cross section of a blade of a rotor of the rotorcraft of FIG. 1A.

Figure 3:
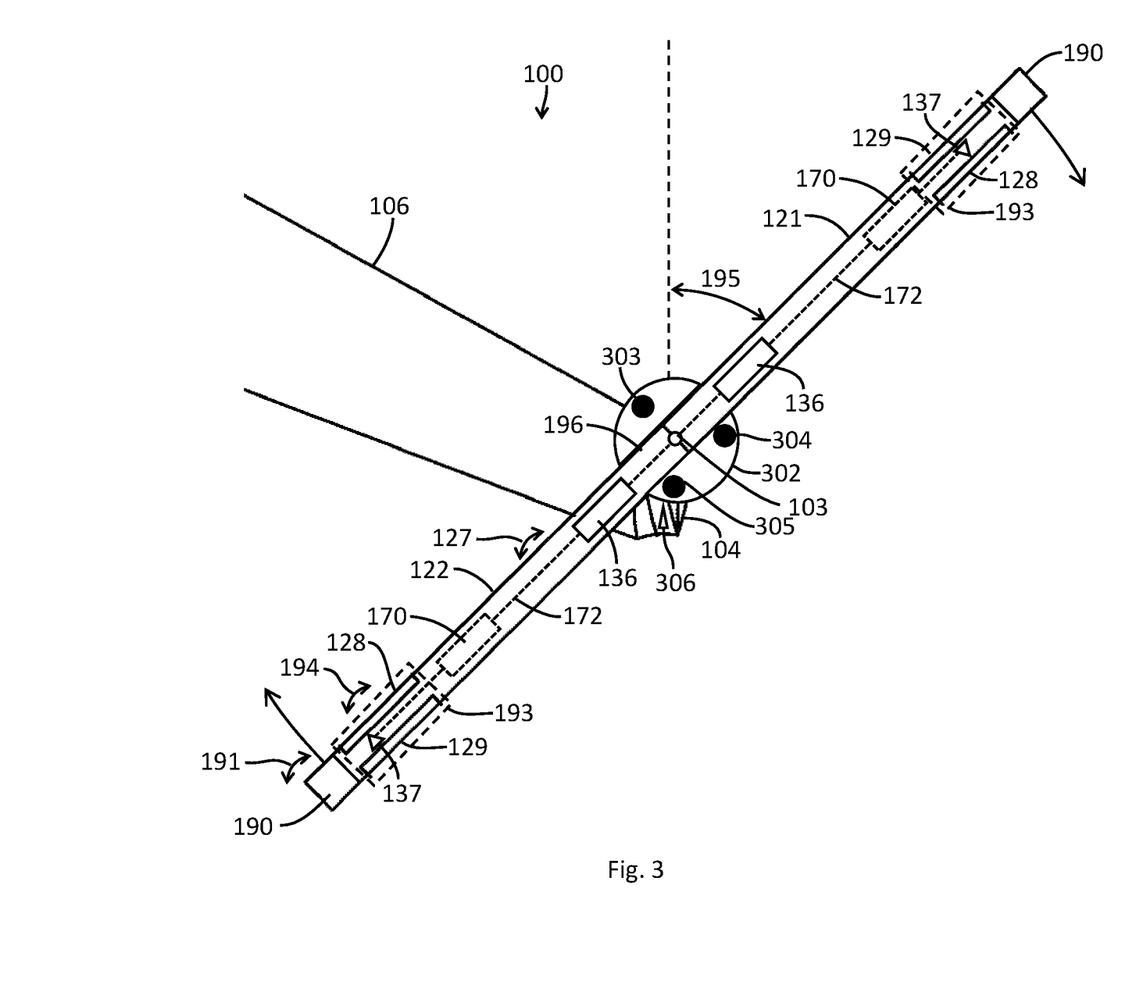
FIG. 3 is a plan view of a rotor of the rotorcraft of FIG. 1A.

FIG. 3 is a plan view of a rotor of the rotorcraft of FIG. 1A.

Referring to FIGS. 1A, 1B and 3, the rotorcraft 100 comprises:
a) a body 101 comprising:
  i) a right wing 106;
  ii) a lifting body 108;
  iii) a left wing 112;
  iv) a first winglet 104 at an outer end of said right wing; and
  v) a second winglet 116 at an outer end of said left wing;
b) a first rotor 102 mounted on a first mast 103;
c) a second rotor 114 mounted on a second mast 115;
d) a control system 111; and
e) an auxiliary propulsion unit 110 adapted to provide forward thrust.

The wings have a rearward sweep angle 146. This reduces the onset of shock waves as the rotorcraft approaches Mach 1. The inventions described herein, however, may be applied to rotorcraft with wings with any sweep angle, including a forward sweep angle. The inventions may be applied to rotorcraft with no wings, no winglets and/or rotorcraft with a body with no substantial lifting properties (e.g., a fuselage).

The body is designed to produce sufficient lift 181 at a transition forward velocity such that the rotorcraft will remain aloft when the rotors are stopped and locked at fixed azimuth angles.

The rotorcraft 100 may further comprise:
a) a first rotor motor 160;
b) a first rotor drivetrain 161 adapted to transmit mechanical power from said first rotor motor to said first mast and hence to said first rotor;
c) a second rotor motor 164; and
d) a second rotor drivetrain 165 adapted to transmit mechanical power from said second rotor motor to said second mast and hence to said second rotor.

The rotor motors may be located in the wings close to the winglets. This will minimize the weight and mechanical slop in the drivetrains.

The rotor motors may be electric motors. The electric motors may receive power from a battery 173 via one or more electrical connections 175, 176. An advantage of an electric rotor motor is that it facilitates a smooth reduction in rotor speed while maintaining efficiency as the rotorcraft increases in forward velocity due to thrust from the auxiliary propulsion unit 110. Nonetheless, the inventions described herein may be applied to a rotor with any form of drive system or power source including rotors that are driven by wind power.

The winglets may be dimensioned to hold a set of one or more rotor control servos 162, 166. Three rotor control servos 303, 304, 305 (FIG. 3) for controlling a swashplate 302, for example, may be provided to independently control the attack angle of each blade. Said independent control is discussed in more detail below with reference to FIG. 5.

The dimensions of the winglets may be selected to minimize drag when the rotorcraft is in forward flight. The winglet height 145 may be kept low so that the rotor height 149 above the center of mass 148 of the rotorcraft is kept low. This will facilitate three axis 185 control during a second forward flight mode where all forward thrust is provided by the auxiliary propulsion unit and the rotors are held at fixed azimuth angles 195 (FIG. 3).

The winglets may be vertical or at an angle with respect to the vertical. The winglets may also have a sweep angle with respect to the vertical. The winglets may proceed downward from the body 101. When the winglets proceed downward, the rotors may be mounted below the winglets.

The rotor control servos may be electrically or hydraulically driven under the control of the control system. The rotor control servos may mechanically transmit control actions to the rotors via control actuators 163, 167. Each control actuator may comprise a swashplate 302 (FIG. 3) for individually controlling the attack angles (e.g., 127) of the rotor blades 121, 122, 123, 124 of the rotors.

The methods described herein may be applied to any number of rotor blades on a rotor. Any number of rotors may be on a rotorcraft.

Provision may be made for a human pilot. A cockpit (not shown) may be provided. The rotorcraft may also be operated by remote control or may have autonomous operation.

The rotorcraft may further comprise a first rotor locking mechanism 125 and a second rotor locking mechanism 126. The locking mechanisms may be designed to engage one or more of the rotor motors, rotor drivetrains, masts, or rotors themselves to hold each rotor at a fixed azimuth angle during said second flight mode.

An exemplary locking mechanism is a pin that is reversibly inserted into a rotor motor to lock it in place. Any locking mechanism, such as a clamp, may be used. An advantage of a locking mechanism is that electric power is not needed to hold said rotors at said fixed azimuth angles during said second flight mode. The locking mechanism may alternatively be a high torque electric motor that can continuously adjust the azimuth angles when powered, but will hold a fixed azimuth angle when not powered.

The auxiliary propulsion unit 110 may be any propulsion unit, such as a propeller, ducted fan, or jet engine. The auxiliary propulsion unit may be driven by an electric motor (not shown) and receive power via an electrical connection 174 to said battery 173. Any number of auxiliary propulsion units may be provided.

The auxiliary propulsion unit may be a fuel powered device, such as a jet engine. An advantage of a fuel powered device is that it may comprise a generator 177 for recharging said battery.

The auxiliary propulsion unit may provide directional thrust 147. An advantage of directional thrust is that the auxiliary propulsion unit can provide pitch and yaw control (e.g., axes 185) of the rotorcraft when the auxiliary propulsion unit is engaged.

The first rotor 102 may comprise a first blade 121 and a second blade 122. The second rotor 114 may comprise a first blade 123 and a second blade 124. A faring (e.g., 138) may be provided between each first and second blade to reduce drag.

The rotors may be rigid rotors or articulated rotors. An advantage of rigid rotors is that they can be held at fixed azimuth angles during said second flight mode. An advantage of articulated rotors is that they will be less sensitive to modal vibrations during a first hover flight mode. The rotors may comprise a mechanical locking mechanism to transition between articulated rotors and rigid rotors.

More than two blades may be provided with each rotor. In a three-blade rotor, for example, the first and second blade may be at angle of about 120 degrees with respect to each other. Any number of blades per rotor may be provided.

The width 141 of the blades may be selected to provide adequate lift during said first hover flight mode and adequate control with minimal drag during said second flight mode. Said first hover flight mode may be a hover mode where lift, forward motion, backward motion, and lateral motion are provided by the rotors. One or more of roll, pitch, and yaw control may be provided by varying the attack angle of the rotors. Attack angle control may be implemented by swashplate control.

The width of the rotor blades may be about uniform over the length of a blade. The widths of each rotor blade may be the same or may be different. Alternatively, the widths of the blades may vary over their length. The blades, for example, may be wide at their root and narrow at their tip. This will provide greater twist resistance during flight. A counter twist may be built into the blades such that they induce less drag from a more desirable twist distribution.

The exemplary embodiment of FIG. 1A shows the two rotor blades in a tandem configuration. The rotors may be sized to have acceptably small downwash for rescue operations of persons during said first flight mode.

The lengths 140 of each blade may be about the same. The lengths may alternatively be different. The lengths of the blades may be about equal to or less than the lateral distance 144 from the rotorcraft centerline 142 to each mast axis (e.g., 143). Thus, in said first flight mode, the rotors may synchronously counter rotate 183, 184 to provide lift before the auxiliary propulsion unit is engaged. During said first flight mode, each blade provides lift (e.g., 180) acting on a center of lift (e.g., 186). Control of the rotorcraft during said first flight mode may be by standard controls (e.g., a swashplate) for a tandem rotor rotorcraft. The center of lift of a rotor blade may lead or lag a center of mass 187 of the rotor blade.

In an alternative embodiment, the rotors may be intermeshing. In said embodiment, the rotors may be mounted on pylons (not shown) proceeding from the lifting body 108.

In an alternative embodiment, the rotors may be coaxial. In said embodiment, the masts may be mounted in a single pylon (not shown) proceeding from the lifting body. Said single pylon may be mounted proximate to the center of mass 148 of the rotorcraft.

Additional rotors may be provided depending upon design requirements and expected use, such as size and/or packaging constraints. Any number of rotors may be provided.

FIG. 1B is a cross section of a blade (e.g., 123) at a lateral vertical plane 132 (FIG. 1A). The blade may be symmetric about a vertical centerline 133. This will facilitate the control of the blades during said second flight mode since the forward edges of the first and second blades of each rotor will be the same. It also allows either blade of a rotor to be a forward blade or an aft blade during said second flight mode.

Each blade may comprise a leading-edge flap (e.g. 128) and a trailing-edge flap (e.g., 129). An attack angle (e.g., 130 FIG. 1A) of each flap may be independently controlled by a servo 170 (FIG. 3) in each blade. Control and power to said blade servos may be through electrical connections 172 (FIG. 3) from the control system 111 through a swashplate (e.g., brushes or capacitive and/or inductive coupling) and into the blades. A control system for the flaps may alternatively be located on a blade itself. Backup electrical power (not shown) may be provided in each blade. The backup power may be designed to withstand high Coriolis forces in said blade. Suitable backup power devices include a solid-state battery and/or an electrolyte-free capacitor bank.

FIG. 1B shows a blade with a positive attack angle 127 between a chord 134 of said blade and a horizontal 135. A positive angle of attack provides lift. A negative angle of attack provides downward force.

FIG. 1B shows the leading-edge flap 128 and trailing-edge flap 129 in a drag-only configuration. The leading-edge and trailing-edge flaps may alternatively be adjusted to increase or decrease lift at a flap section 193 (FIG. 3) of a blade. The leading-edge and trailing-edge flaps may alternatively be adjusted to provide an incremental twist 194 (FIG. 3) to said flap section of said blade relative to a root 196 (FIG. 3) of said blade. Incremental twist, for example, can be provided by increasing an angle of attack of a leading-edge flap and decreasing an angle of attack of a trailing-edge flap.

As used herein, a "leading-edge" is an edge that travels into an air stream. A "trailing-edge" is an edge that travels away from an airstream. Thus, a particular flap may alternate between leading edge and trailing edge depending upon the flight mode of the rotorcraft. An advantage of having flaps on opposite sides of a blade is that said flaps can alternate between leading-edge and trailing-edge such that there is always a leading-edge or trailing-edge flap depending upon the flight mode.

A plurality of leading-edge and trailing-edge flap pairs may be provided on a rotor blade.

A rotor tip section 190 may be provided on one or more rotor blades. The rotor tip section may have a controllable angle of attack 191. An advantage of a rotor tip section is that it allows for control of the air flow around the rotor tip, especially during stall events of the rotor tip section.

Each blade may comprise one or more motion sensors such as an accelerometer 137 or a strain gauge 136. Multiple accelerometers may be provided on a rotor blade with multiple axes of motion detections. Said multiple accelerometers may provide multiple signals to the control system to allow the control systems to detect multiple vibration modes of the rotor blade. One or more accelerometers may be provided near the tip of a rotor blade in the vicinity of the flaps 128, 129.

One or more accelerometers 306 may be provided on the body 101 of the rotorcraft. The accelerometers may be provided close to the rotors, such as on the winglets. An advantage to having accelerometers on the body of the rotorcraft is that the control system can still infer vibration modes of the rotor blades in case the sensors on the rotor blades should fail.

Multiple strain gauges may be provided on a rotor blade. Said multiple strain gauges may provide multiple signals to the control system to allow the control system to detect multiple vibration modes of the rotor blade. One or more strain gauges may be provided near the root of a rotor blade.

Control System

Figure 2:
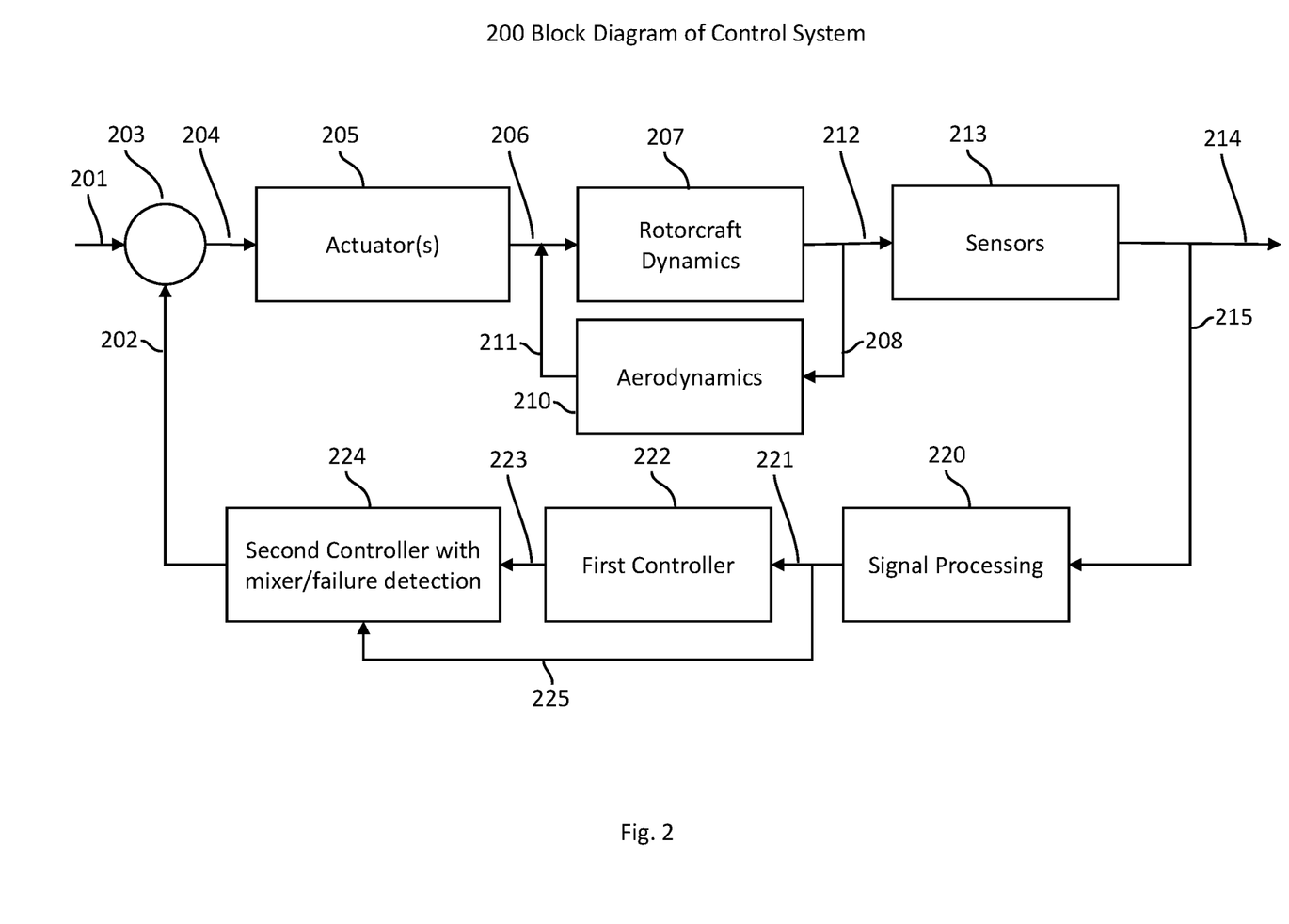
FIG. 2 is a block diagram of a control system for a rotor.

FIG. 2 is a block diagram of a control system 200 used for controlling the rotorcraft. The control system may comprise one or more of a computer-based system, an electronic analog system, a fluid mechanical system, a mechanical system, or combinations thereof.

The control system may comprise an input device for receiving an input signal 201. The input signal may be from a human pilot, a sensor, another control system, or any other source.

The input signal may be a nominal motion of a rotor blade. As used herein, a "nominal motion" is a motion within an envelope of acceptable motions. A nominal motion, for example, might include a rotation frequency of a rotor blade determined at least in part by a flight mode of the rotorcraft.

As used herein, an "out-of-compliance motion" is a deviation of a measured motion away from the nominal motion. A lead-lag vibration of a rotor blade at a mode of said rotor blade, for example, may be an out-of-compliance motion if said lead-lag vibration grows at an unacceptable rate.

A desired function of a control system is to dampen out-of-compliance motions such that a measured motion of a rotor blade returns to a nominal motion or stays within an acceptable envelope of a nominal motion.

As used herein, a "mode" of a rotor blade is a vibration resonance of a rotor blade. A mode may be characterized by a frequency and an amplitude. If a rotor blade rotates at a frequency near a mode, then the amplitude of the mode may grow. If there is insufficient damping of the mode, the amplitude may grow to the point where mechanical damage occurs to the rotor blade.

Regarding the control system 200, a summing junction 203 may be provided to combine the input signal 201 with a feedback control signal 202. The combined signals 204 are fed into one or more actuators 205. The actuators control 206 various control surfaces of the rotorcraft. Said control surfaces may be flaps on said rotors, the tip sections of the rotors or the attack angles of the rotor blades themselves. The dynamics 207 of the rotorcraft respond 212 to the movements of the control surfaces. This affects 208 the aerodynamics 210 of the air flowing around the rotorcraft. The changes in the airflow feedback 211 to the rotorcraft dynamics 207.

Sensors 213 on the rotorcraft (e.g., pitot tubes, accelerometers, strain gauges, gyroscopes, etc.) sense one or more of the rotorcraft dynamic responses and aerodynamic responses to the control surface adjustments.

The sensor signals 215 are processed in a signal processing module 220 (e.g., amplification, noise reduction, frequency filtering, etc.) and fed into 221 at least a first controller 222. If the first controller senses an out-of-compliance motion 214, then a control signal 223 may be generated to counteract (e.g., dampen) the out-of-compliance motion. For example, if the control system detects the onset of an unacceptable growth in the amplitude of a mode, then a control signal would be generated to dampen out said unacceptable growth.

The processed sensor signal 221 may also be fed 225 into a second controller 224. The second controller may also detect a deviation from a desired rotorcraft response and generate an appropriate control signal. The second controller may further comprise a mixer for mixing the two control signals. The second controller may also comprise a failure detection module. If the failure detection module detects a failure of one of the controllers, then the signal from the properly functioning controller will be fed back 202 to the summing junction. Any number of additional controllers may be provided.

The first and second controllers may have different control algorithms designed to control different actuators in response to an out-of-compliance motion. For example, the first controller may control the attack angle of one or more of the rotor blades and the second controller may control one or more of the leading-edge or trailing-edge flaps on the rotor blades. The outputs of the controllers may be coordinated in their response to the out-of-compliance motion. Thus, the two independent systems can act as backup for each other in the event that one of the systems fails. If both systems are operating properly, then one of the systems may be preferred (e.g., the flap control) with the other serving as a backup in case the preferred system fails.

A challenge in any aircraft design is to have multiple backup systems for safety without adding undue weight or complexity.

The control system may be recursive. For example, the first controller 222 may comprise all of the elements of the control system 200. Thus, a control system for roll, pitch, and yaw control of the rotorcraft may have a control system for out-of-compliance vibration mode damping nested within it.

Flight Modes

The rotorcraft 100 may have three or more flight modes. The flight modes may comprise a first hover flight mode, an intermediate forward flight mode, and a second flight mode. Other flight modes may be provided (e.g., supersonic).

The first hover flight mode may be a rotor-only flight mode. The rotors rotate about their respective masts to provide lift as well as lateral motion. Roll, pitch, and yaw control may be provided by the rotors using standard rotor control techniques.

The intermediate forward flight mode is a rotor-plus-auxiliary-propulsion-unit flight mode. The auxiliary propulsion unit provides forward thrust. The body 101 provides some lift 181 at a center of lift 182 due to the rotorcraft's forward motion through the air. The spinning rotors provide additional lift as needed. As the forward velocity of the rotorcraft increases, the rotational speed of the rotors can be decreased since less lift is required from them. This reduces the parasitic drag of the rotors.

An advantage of driving the rotors with electric powered rotor motors is that slowing the rotors is straightforward as it does not result in significant efficiency and/or multiple drivetrain resonances if properly designed.

As long as the rotors are rotating, they can provide at least one of roll, pitch, and yaw control by varying the attack angle of the rotors. If the auxiliary propulsion unit has directional thrust, then it can provide additional pitch and yaw control.

At a high enough forward velocity (e.g., the transition forward velocity), the body 101 provides enough lift so that the rotors can be stopped. This is the second flight mode. When the rotors are stopped, then roll, pitch, and yaw control can be provided by varying the attack angles of the rotor blades. This is described in more detail in copending PCT patent application "High-Speed, Vertical Take-Off and Landing Aircraft", serial number PCT/US20/63697, filed Dec. 8, 2020. Said PCT patent application is incorporated herein by reference.

Damping Rotor Vibration Modes

Figure 4A:
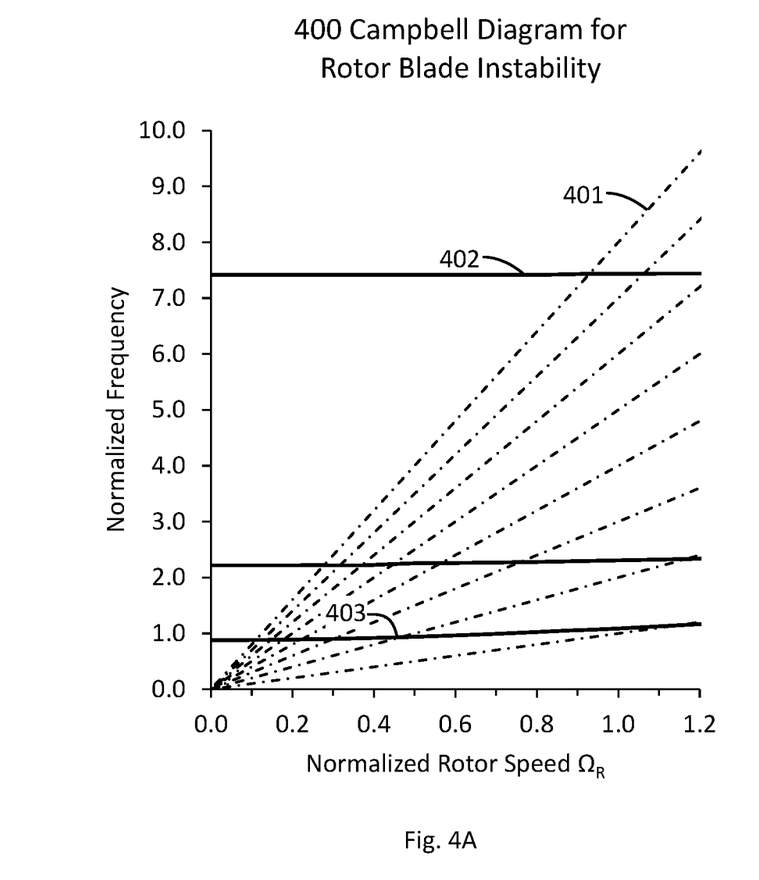
FIG. 4A is a Campbell Diagram illustrating modes of a rotor blade.

FIG. 4A is a Campbell Diagram 400 illustrating vibration modes of a rotor blade. The diagram shows normalized frequency on the Y-axis versus normalized angular rotor speed on the X-axis. The angular rotor speed is normalized by the angular rotor speed that is required for the rotors to lift the rotorcraft and hover in the first flight mode. The vibration frequency of the rotor blade is similarly normalized by the rotor frequency required to lift the rotorcraft and hover in the first flight mode.

Dashed lines 401 show synchronous lines of the rotor and 1×, 2×, 3× etc. of the normalized rotor speed. Solid lines 402 show different vibration modes of the rotor blade. When a solid line intersects 403 a dashed line, a resonance with a mode occurs. If there is insufficient damping of the mode, then the resonance vibration will grow in amplitude and rotor blade damage can occur.

One of the technical challenges of operating the rotorcraft in the intermediate forward flight mode is that as the rotorcraft forward velocity increases, the desired rotor speed decreases. As the rotor speed decreases, the rotor will pass through one or more resonances 403 and blade damage, excessive rotorcraft vibration, and/or rotorcraft control difficulties can occur. This problem can be particularly severe when rigid rotors are used instead of articulated rotors. As described above, rigid rotors provide an advantage in the second flight mode where the rotors are held at fixed azimuth angles and provide pitch, yaw and roll control of the rotorcraft. There is need, therefore, for a method for stabilizing a motion of a rotor blade, such as damping a vibration mode of said rotor blade.

Method for Stabilizing a Motion of a Rotor Blade

A method for stabilizing a motion of a rotor blade of a rotor may comprise the steps:
 a) read into a controller, a measurement from a sensor responsive to said rotor blade, said measurement being of a motion of said rotor blade;
 b) determine, by said controller, an out-of-compliance motion of said rotor blade, said out-of-compliance motion of said rotor blade being a difference between said measured motion of said rotor blade and a nominal motion of said rotor blade; and
 c) output, from said controller, a first control signal to an actuator affecting said rotor blade
 wherein:
 d) said first control signal is determined by a control algorithm executed by said controller;
 e) said actuator causes a change in one or more of a drag, lift or torsion of said rotor blade counter to said out-of-compliance motion of said rotor blade; and
 f) said out-of-compliance motion of said rotor blade is one or more of:
  i) a lead of said rotor blade ahead of said nominal motion of said rotor blade;
  ii) a lag of said rotor blade behind said nominal motion of said rotor blade;
  iii) an upward motion of said rotor blade above said nominal motion of said rotor blade;
  iv) a downward motion of said rotor blade below said nominal motion of said rotor blade; or
  v) a twist of said rotor blade away from said nominal motion of said rotor blade.

The control algorithm may comprise one or more of:
 a) a proportional control algorithm wherein:
  i) said proportional control algorithm increases a damping of a mode of said rotor blade; or
  ii) said proportional control algorithm modifies a rotor coupling parameter to increase a damping of a mode of said rotor blade; or
 b) a state-space control algorithm wherein:
  i) said state-space control algorithm modifies a damping and a frequency of multiple modes of said rotor blade in order to increase overall system damping; or
  ii) said state-space control algorithm modifies one or more rotor coupling parameters to increase damping of multiple modes of said rotor blade.

Any control algorithm that increases damping of vibrational modes of a rotor blade can be used. Other suitable algorithms include PID (proportional-integral-derivative) control, neural network control, and control systems based on Floquet-Lyapunov theory.

Proportional Control

Figure 4B:
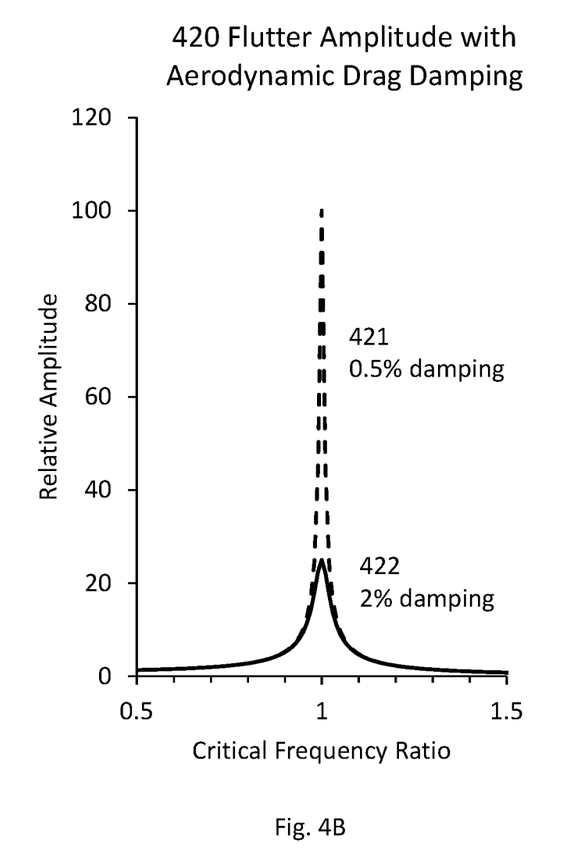
FIG. 4B is a graph of simulated flutter amplitude versus critical frequency ratio for a rotor stabilized by a proportional control algorithm.

FIG. 4B is a graph 420 of simulated flutter amplitude versus critical frequency ratio for a rotor stabilized by a proportional control algorithm. The algorithm simulated an actuator response (e.g., vary aerodynamic drag of the rotor) by an amount proportional to a simulated amplitude of an out-of-compliance flutter mode of the rotor. Multiple amplitudes of the resultant out-of-compliant motions were then calculated for a range of critical rotational frequency ratios at two different damping levels, 0.5% (curve 421) and 2% (curve 422). The critical frequency ratio was the ratio of the rotational frequency of the rotor to the frequency of the flutter mode (e.g., 403 FIG. 4A). When damping was increased, the relative amplitude of the flutter mode decreased to a level that was within the nominal operating envelope of the rotor motion.

Figure 6:
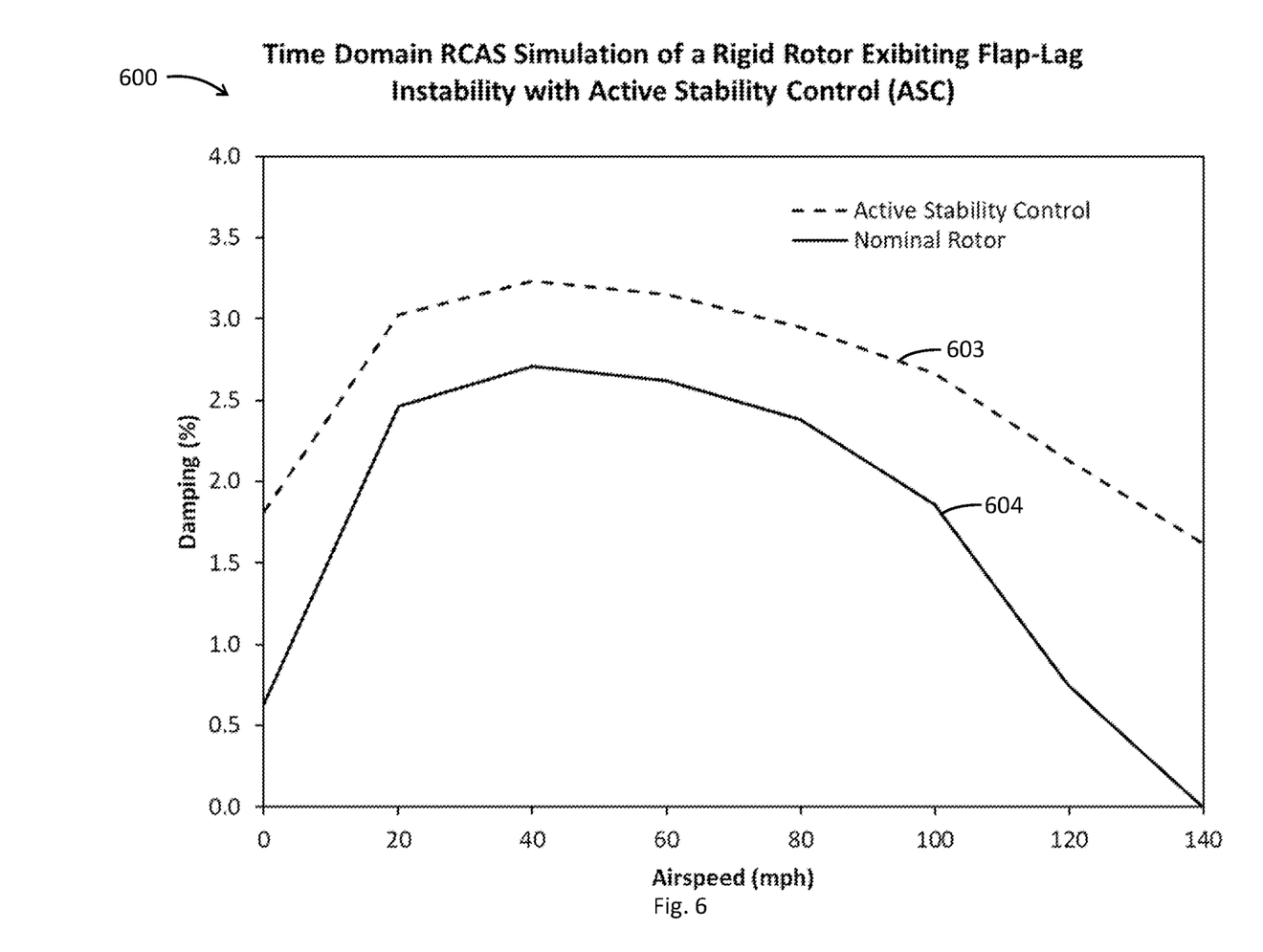
FIG. 6 is a graph illustrating a simulated performance of a rotor exhibiting flap-lag instability.

FIG. 6 is a graph 600 illustrating a simulated performance of a rotor exhibiting flap-lag instability. The simulated rotorcraft was in the intermediate forward flight mode. The normalized rotor speed was 0.75. Vibration damping is shown on the Y-axis. Rotorcraft forward airspeed is shown on the X-axis. The damping of the flap-lag instability was modeled using the Rotorcraft Comprehensive Analysis System (RCAS). The RCAS is described in more detail in the paper by Andrews, Joseph et al. entitled "Real-Time Extraction of Rotor Modal Information for Stability Monitoring and Correlation", proceedings American Helicopter Society Future Vertical Lift Aircraft Design Conference, San Francisco, CA, Jan. 18-20, 2012, American Helicopter Society International, Inc. Said paper is incorporated herein by reference with specific reference to the RCAS system described therein.

Vibration damping was simulated using the same proportional control illustrated in FIG. 4B. A first curve 604 shows damping without any active control. The second curve 603 shows damping with active control. The relative benefits of active control increase as air speed increases.

The proportional control algorithm could also modify a rotor coupling parameter such that damping is increased for a mode of the rotor. A rotor coupling parameter indicates how much one type of motion of a rotor will impact another type of motion. For example, when a blade twists up, this increases the drag and causes the blade to lag. The lag, in turn, causes the blade to twist up even more increasing the lag even more and so on. A proportional control algorithm, therefore, could be implemented to counter out-of-compliance blade twist, such as by controlling the leading-edge flaps and/or the trailing edge flaps on the rotor blade. The twist could be sensed by a strain gauge or accelerometers on the blade. By countering the twist, the coupling parameter is decreased and the lag mode is effectively damped.

State-Space Control

Another suitable control algorithm is state-space based linear-quadratic control. Linear-quadratic control can operate on an input vector comprising a plurality of measurements from a plurality of sensors and provide an output vector of a plurality of control signals to a plurality of actuators. The linear-quadratic control algorithm may be tuned to minimize the sum of squares of multiple out-of-compliance motions of a rotor blade. Thus, the algorithm may simultaneously modify a damping and a frequency of multiple modes of a rotor blade to increase overall system damping.

The output vector of the plurality of control signals from a linear-quadratic control algorithm can also be used to modify one or more coupling parameters between vibrational modes of a rotor blade to simultaneously increase damping of multiple modes of the rotor blade.

Other suitable state-space control algorithms can include linear-quadratic regulators, linear-quadratic Gaussian control, or model predictive control.

Control of Multiple Rotor Blades

Each rotor blade of a rotor may have a similar control system for stabilizing motion. The control systems may operate independently of each other. This has the advantage of taking into account individual differences between rotor blades on a rotor. The differences may be due to manufacturing differences (e.g., slightly different positions of centers of mass) or wear/damage differences that are introduced over the life of the rotor blades (e.g., sand abrasion, bird strike).

Alternatively, the individual blade control systems may be under the control of an overall control system. An advantage of an overall system control is that blade-to-blade coupling modes can be measured and controlled if present.

Actuator Control Actions

There are many different actuator control actions that can be used to achieve stabilization of a rotor blade of a rotor. These actions may include:
  a) increase a drag on a rotor blade when the out-of-compliance motion comprises a lead of said rotor blade ahead of a nominal motion of said rotor blade;
  b) decrease a drag on a rotor blade when the out-of-compliance motion comprises a lag of said rotor blade behind a nominal motion of said rotor blade;
  c) decrease a lift of a rotor blade when the out-of-compliance motion of said rotor blade comprises an upward motion of said rotor blade above a nominal motion of said rotor blade;
  d) increase a lift of a rotor blade when the out-of-compliance motion of said rotor blade comprises a downward motion of said rotor blade below a nominal motion of said rotor blade; or
  e) apply an incremental twist to a rotor blade when the out-of-compliance motion of the rotor blade comprises a twist of said rotor blade away from a nominal motion of said rotor blade.

In the above examples, an increase or decrease in drag on a rotor blade may be effected by one or more of:
  a) a change in attack angle of one or more trailing-edge or leading-edge flaps mounted on said rotor blade; or
  b) a transient positive change in attack angle of said rotor blade followed by a transient negative change in attack angle of said rotor blade such that said lift of said rotor blade first increases and then decreases by an equal amount.

The transient positive change in attack angle of a rotor blade followed by a transient negative change in attack angle of a rotor blade to effect a change in drag is described in more detail below with respect to FIG. 5.

An increase or decrease in lift of a rotor blade may be effected by one or more of:
  a) a change in angle of attack of one or more trailing-edge or leading-edge flaps mounted on a flap section of said rotor blade to increase or decrease a lift of said flap section of said rotor blade;
  b) a change in angle of attack of one or more trailing-edge or leading-edge flaps mounted on said rotor blade to increase or decrease a blade twist of said rotor blade;
  c) a change in attack angle of said rotor blade; or
  d) a change in attack angle of a rotor blade tip section of said rotor blade.

Regarding twist, the change of said angle of attack of one or more trailing-edge or leading-edge flaps to increase blade twist may comprise:
  a) increasing an angle of attack of a leading-edge flap; and
  b) decreasing an angle of attack of a trailing-edge flap.

Damping Blade Vibration Modes with Swashplate Control

The methods for damping vibration modes of a rotor bade may be implemented through swashplate control of the attack angles of the rotor blades. Referring to FIG. 3, a minimum of three actuators 303, 304, 305 on a fixed swashplate 302 are required to independently control the attack angles of two rotors blades 121, 122 on a time-domain basis as the rotor blades rotate about a mast 103. Vibration modes of the rotors can be sensed by two or more accelerometers 306 mounted on the rotorcraft. The two or more accelerometers may be proximate to the mast of the rotor, such as being mounted on a winglet 104.

Figure 5:
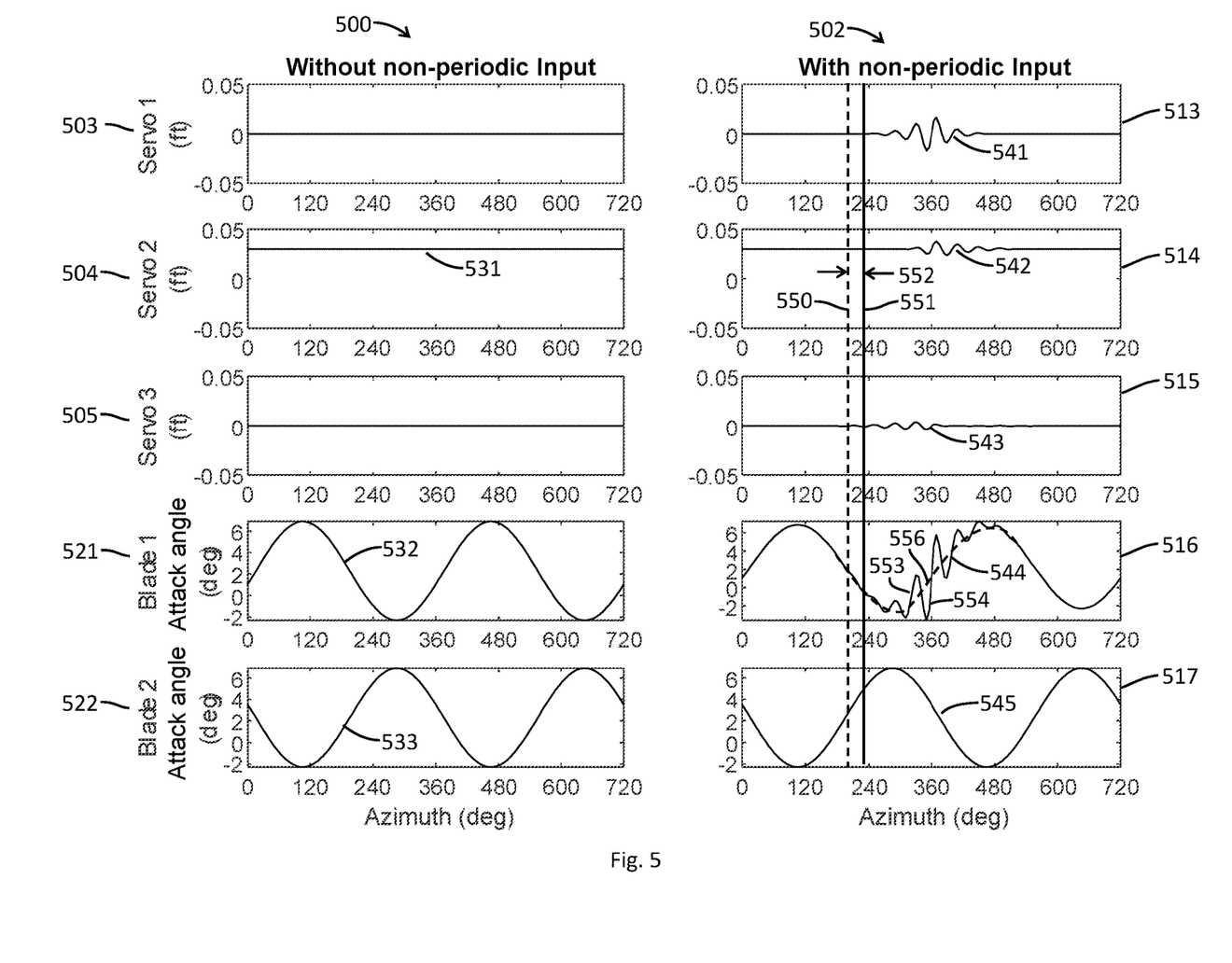
FIG. 5 is a set of graphs illustrating a simulated performance of a rotor using swashplate control.

FIG. 5 shows two series of graphs illustrating how the swashplate control of vibration mode damping can work. The first series of graphs 500 show swashplate control without non-periodic input. Graphs 503, 504, 505 show positions of servo 1, servo 2, and servo 3 of the swashplate versus blade azimuth angle. Servos 1, 2 and 3 correspond to actuators 303, 304 and 305. The servos are at fixed positions (e.g., 531) versus azimuth angle.

Graphs 521 and 522 show the attack angles 532, 533 of blade 1 (121 FIG. 3) and blade 2 (122 FIG. 3) versus azimuth angle. The fixed positions of the servos lead to periodic motion of the rotor blades. This might be desired in forward flight where the attack angle of a blade when it advances into an airstream might be low and the attack angle of a blade when it retreats from an airstream might be high.

The second series of graphs 502 correspond to the first series of graphs except that non-periodic input is provided to the servos to cause transient changes in the attack angle of one blade (e.g., blade 1) independently of the attack angle of the other blade (e.g., blade 2). As used herein, "non-periodic" when referring to a blade motion refers to a motion that is not an even multiple of a blade's rotation frequency over a single cycle of rotation. A non-periodic blade motion, however, may exhibit periodicity within itself.

Graphs 513, 514, 515 show non-periodic servo motions 541, 542, 543 that result in non-periodic changes 544 in the attack angle of blade 1 (graph 516) without causing a change in the periodic motion 545 of blade 2 (graph 517). The non-periodic motion of blade 1 may comprise alternating increases 553 and decreases 554 of attack angle relative to the periodic value 556. These alternating increases and decreases will increase the drag of blade 1 over the indicated range of azimuth angle, without changing the net lift of the blade over that same range of azimuth angle relative to the periodic value. As described above, this can dampen lead-lag modes of the blade.

Non-periodic control of the blade attack angle in response to measured modal instabilities may be characterized at time-domain control. The effectiveness of time-domain control is a function of the delay 552 between a sensed condition of the blade 550 and the blade response 551 to actions by the control system. The delay can be expressed as an azimuth angle difference. An azimuth angle difference of 30 degrees or less between measurement and response is suitable for rotor blade control of modal damping.

CONCLUSION

While the disclosure has been described with reference to one or more different exemplary embodiments, it will be understood by those skilled in the art that various changes may be made and equivalents may be substituted for elements thereof without departing from the scope of the disclosure. In addition, many modifications may be made to adapt to a particular situation without departing from the essential scope or teachings thereof. Therefore, it is intended that the disclosure not be limited to the particular embodiment disclosed as the best mode contemplated for carrying out this invention.

What is claimed is:

1. A method for stabilizing a motion of a single rotor blade of a rotor comprising the steps:
   a) read into a controller, a measurement from a sensor located on or directly measuring said rotor blade, said measurement being of a motion of said rotor blade;
   b) determine, by said controller, a non-stable out-of-compliance motion of said rotor blade, said non-stable out-of-compliance motion of said rotor blade being a difference between said measured motion of said rotor blade and a stable nominal motion of said rotor blade; and
   c) output, from said controller, a first control signal to an actuator affecting said rotor blade
   wherein:
   d) said first control signal is determined by a control algorithm executed by said controller;
   e) said actuator causes a change in one or more of a drag, lift or torsion of said rotor blade counter to said non-stable out-of-compliance motion of said rotor blade and to stabilize said rotor blade; and
   f) said non-stable out-of-compliance motion of said rotor blade is determined by all of the following:
   i) measuring an upward motion of said rotor blade above said stable nominal motion of said rotor blade;
   ii) measuring a downward motion of said rotor blade below said stable nominal motion of said rotor blade; and
   iii) measuring a twist of said rotor blade away from said stable nominal motion of said rotor blade.

2. The method of claim 1 wherein said control algorithm comprises one or more of:
   a) a proportional control algorithm wherein:
      i) said proportional control algorithm increases a damping of a mode of said rotor blade; or
      ii) said proportional control algorithm modifies a rotor coupling parameter to increase a damping of a mode of said rotor blade; or
   b) a state-space control algorithm wherein:
      i) said state-space control algorithm modifies a damping and a frequency of multiple modes of said rotor blade in order to increase overall system damping; or
      ii) said state-space control algorithm modifies one or more rotor coupling parameters to increase damping of multiple modes of said rotor blade.

3. The method of claim 2 wherein said proportional control algorithm adjusts an angle of attack of a flap on said rotor blade in order to reduce a pitch-lag coupling parameter of said rotor blade and hence increase damping of a lag mode of said rotor blade.

4. The method of claim 1 which further comprises the step of independently applying said steps (a) to (f) to a plurality of rotor blades on said rotor.

5. The method of claim 1 wherein said first control signal causes said actuator to
   perform one or more of the steps:
   a) increase a drag on said rotor blade when said non-stable out-of-compliance motion comprises said lead of said rotor blade ahead of said stable nominal motion of said rotor blade;
   b) decrease a drag on said rotor blade when said non-stable out-of-compliance motion comprises said lag of said rotor blade behind said stable nominal motion of said rotor blade;
   c) decrease a lift of said rotor blade when said non-stable out-of-compliance motion of said rotor blade comprises said upward motion of said rotor blade above said stable nominal motion of said rotor blade;
   d) increase a lift of said rotor blade when said non-stable out-of-compliance motion of said rotor blade comprises said downward motion of said rotor blade below said stable nominal motion of said rotor blade; or apply an incremental twist to said rotor blade when said non-stable out-of-compliance motion of said rotor blade comprises said twist of said rotor blade away from said stable nominal motion of said rotor blade.

6. The method of claim 5 wherein said increase of said drag on said rotor blade is effected by one or more of:
   a) a change in attack angle of one or more trailing-edge or leading-edge flaps mounted on said rotor blade; or
   b) a transient positive change in attack angle of said rotor blade followed by a transient negative change in attack angle of said rotor blade such that said lift of said rotor blade first increases and then decreases by an equal amount.

7. The method of claim 5 wherein said increase in said lift of said rotor blade is effected
   by one or more of:
   a) a change in angle of attack of one or more trailing-edge or leading-edge flaps mounted on a flap section of said rotor blade to increase a lift of said flap section of said rotor blade;
   b) a change in angle of attack of one or more trailing-edge or leading-edge flaps mounted on said rotor blade to increase a blade twist of said rotor blade;
   c) a change in attack angle of said rotor blade; or
   d) a change in attack angle of a rotor blade tip section of said rotor blade.

8. The method of claim 7 wherein said change of said angle of attack of said one or more trailing-edge or leading-edge flaps to increase said blade twist comprises:
   a) increasing an angle of attack of a leading-edge flap; and
   b) decreasing an angle of attack of a trailing-edge flap.

9. The method of claim 7 wherein said change of said attack angle of said rotor blade is
   effected by a swashplate comprising three or more actuators such that said change of angle of attack of said rotor blade is independent of an angle of attack of another rotor blade on said rotor.

10. The method of claim 5 wherein said decrease in drag of said rotor blade is effected by a change in angle of attack of one or more trailing-edge or leading-edge flaps mounted on said rotor blade.

11. The method of claim 1 wherein said steps further comprise:
    a) rotate said rotor at an initial hover rotation speed during a first hover flight mode; and
    b) rotate said rotor at an intermediate rotation speed less than said initial hover rotation speed during an intermediate forward flight mode.

12. The method of claim 11 wherein:
    a) said intermediate rotation speed is at about a mode of said rotor blade; and
    b) said control algorithm effects a damping of said mode of said rotor blade of at least 0.5%.

13. The method of claim 1 wherein said sensor comprises one or more of an accelerometer or a strain gauge mounted to said rotor blade.

14. The method of claim 1 wherein said rotor is on a rotorcraft.

15. The method of claim 14 wherein said sensor comprises two or more accelerometers mounted on a body of said rotorcraft.

16. The method of claim 14 wherein said sensor comprises two or more strain gauges mounted on a body of said rotorcraft.

17. The method of claim 14 wherein said rotorcraft comprises a plurality of rotors.

18. The method of claim 1 wherein said rotor is on a wind turbine.

19. The method of claim 18 wherein said wind turbine comprises two or more rotors.

20. The method of claim 1, wherein the said non-stable out-of-compliance motion of said rotor blade is determined by also all of the following:
    iv) measuring a lead of said rotor blade ahead of said stable nominal motion of said rotor blade; and
    v) measuring a lag of said rotor blade behind said stable nominal motion of said rotor blade.

* * * * *